Patented Dec. 19, 1944

2,365,559

UNITED STATES PATENT OFFICE 2,365,559

METHODS FOR TREATING CALCIUM SULPHATE PIGMENTS

Franklin L. Kingsbury, Old Farm Village, N. J., and Charles L. Schmidt, Webster Groves, Mo., assignors to National Lead Company, New York, N. Y., a corporation of New Jersey No Drawing. Application April 30, 1941, Serial No. 391,098

8 Claims. (Cl. 106—300)

The present invention relates to calcium sulphate pigments and to methods for controlling the bodying properties thereof. The expression "calcium sulphate pigments" as used herein means and includes not only pigmentary calcium sulphate but also composite pigments containing calcium sulphate, for instance, composite titanium dioxide-calcium sulphate pigment.

The bodying properties of a pigment may be defined as the tendency of a pigment to influence the consistency of film-forming surface coating compositions. This property of a pigment, particularly calcium sulphate pigments, such as titanium dioxide-calcium sulphate pigment, is usually developed through the use of so-called "bodying agents" which are added to pigmented film-forming compositions particularly flat wall paints for the purpose of increasing the consistency of the composition. Bodying agents most commonly used are water and soap solutions. The extent of bodying, i. e. increase in consistency, developed by the bodying agent will vary depending upon the nature of the pigment portion of the film-forming material, and it has been found in connection with titanium dioxide-calcium sulphate pigments that different batches although containing the same relative proportions of titanium dioxide and calcium sulphate give different bodying effects when incorporated in film-forming vehicles to which a bodying agent is added.

It will be appreciated that the control of the bodying properties of calcium sulphate pigments presented a problem of considerable importance to the industry. The present invention provides a simple and effective solution of that problem.

A proper understanding of the invention necessitates a brief consideration of what is meant by the term "consistency" as applied to a film-forming composition, e. g., a paint, and the method of determining it. The consistency of, for instance, a paint has been defined as its resistance to deformation or flow which resistance may be due to viscosity or to plasticity. The method of determining consistency which was employed to obtain the results hereinafter reported was as follows:

An instrument sometimes called a "consistometer" or mobilometer" was employed. This instrument consists of a base plate provided with adjustable screw legs for leveling the instrument, a tall cylinder supported by the base plate for receiving the paint to be tested, a plunger having a perforated disc at one end and a weight pan at the other, and a guide bracket also supported by the base for guiding the fall of the plunger. The cylinder is provided with a mark on its inner surfaces to fix the level to which it is to be filled with paint. The plunger rod has two marks 5 cm. apart which determine the distance of the plunger's fall through the paint. The disc is perforated with 25 holes about $\tfrac{1}{16}$ inch in diameter.

The procedure for testing the pigment involved weighing 120 grams of the pigment into a porcelain enamel cup. A sufficient amount of film-forming vehicle was added to form a paste suitable for grinding when the pigment-vehicle mixture is worked together. The paste was weighed in order to ascertain the weight of vehicle used. It was then run once through a three-roll laboratory mill and after this treatment cut down with additional vehicle so that the paint contains 56 per cent pigment and 44 per cent vehicle. (The vehicle was a processed tung-linseed oil mixture containing 30 per cent of volatile thinner.) 100 grams of the paint so prepared were weighed into a suitable vessel and 0.5 cc. of a 2.0 per cent cobalt naphthenate drier added thereto.

The bodying of a paint prepared as above described was effected by adding to the 100 gram sample 1.5 cc. of a soap solution after the drier had been incorporated. The soap solution was mixed in by stirring, for instance, using a low speed forked stirrer turning at 750 R. P. M., for exactly 6 minutes. After stirring, the paint was allowed to stand to permit the escape of entrapped air and to allow the body to develop which requires a minimum of one-half hour. (The soap solution was prepared by dissolving 1 part by weight of a neutral soap, e. g. Ivory soap flakes, in 99 parts of distilled water and adding thereto 150 parts by weight of ethyl alcohol.) In determining the bodying characteristics of a pigment, determinations were made both on the paint containing no soap solution as well as on the paint so treated.

In carrying out the test in the mobilometer the paint was poured into the cylinder up to the inner mark. The plunger was fastened in the guide bracket while holding it above the level of the paint. The weighting pan and sufficient additional weight so that the weight of the plunger plus pan plus added weight equals a predetermined value was placed on the plunger and the perforated disc immersed in the paint to a depth so that the lower mark on the stem of the plunger was just visible above the collar of the guide bracket. The plunger was held in this position for exactly 30 seconds. The plunger was then allowed to fall through the paint, the time required for the upper mark on the plunger stem to reach the collar of the guide bracket being taken by a stop watch. (The weight of the plunger plus pan plus added weight for testing paints containing no bodying agent was 20 grams; that for bodied paints 40 grams or, if necessary, because of the heavy body 75 grams or even 125 grams.)

The above test was carried out at 70° F. ±2° F. and a relative humidity of 50%.

The results obtained were expressed as gram-seconds which is the product of multiplying the weight of the plunger plus pan plus added weight by the time in seconds required for the plunger to fall the distance between the two marks, i. e., 5 cm. (For a complete discussion of consistency of paints and methods and apparatus for evaluating consistency the reader is referred to Chapter 17, page 561 et seq. "Physical and Chemical Examination of Paints, Varnishes, Lacquers and Colors," by Dr. Henry A. Gardner, eighth edition, 1937, distributed by the Institute of Paint and Varnish Research, Washington, D. C.)

From the foregoing it will be appreciated that a pigment having undesirable bodying characteristics will exert a detrimental effect on the finished surface coating compositions containing it. For instance, if it possesses an excessive bodying tendency the paint will become too thick and lose its brushing characteristics. On the other hand, if the pigment fails to respond to the bodying agent the paint may be too thin for good spreading and introduce sagging difficulties. This is particularly true of titanium dioxide-calcium sulphate pigments. The consistency of the paint obtained after the addition of the bodying agent, usually water or a soap solution, is known as the "bodied consistency," that of the untreated paint as "unbodied consistency."

Thus, it is an object of the present invention to provide means for controlling, i. e., either lowering or increasing the bodying tendency of calcium sulphate pigments. It is another object of the present invention to provide means for treating pigmentary calcium sulphate and composite titanium dioxide-calcium sulphate pigments so that paints may be prepared from such treated pigments possessing any predetermined consistency. These and other objects of the invention will become apparent from the present description.

In its broadest aspect the invention contemplates determining the bodying tendency of a calcium sulphate pigment by testing a sample of the pigment and if it be desired to increase the bodying tendency to admix with the pigment a small amount of an acid or acid-reacting compound or if it be desired to lower the bodying tendency to admix therewith a small amount of an alkali, alkaline-reacting or neutral compound.

Thus, according to the present invention, it has been found that the addition of small amounts of alkaline reacting inorganic compounds, including the oxides, hydroxides and carbonates of the alkali- and alkaline earth metals will lower the bodying tendency of calcium sulphate pigments. Neutral inorganic salts such as those resulting from the neutralization of a strong base, e. g. KOH or NaOH, with a strong acid, e. g. nitric, sulphuric, phosphoric, hydrochloric will have the same effect as those resulting from the neutralization of a weak base and a weak acid, namely to lower the bodied consistency. Alkaline reacting salts, e. g. those resulting from the neutralization of a strong base, e. g. KOH or NaOH and a weak acid, e. g. boric acid, arsenic acid, titanic acid, salicylic acid, tartaric acid, hydrosulphuric acid, etc. also lower the bodying tendency. Buffer mixtures of salts which exhibit a pH value of about 7.0 or higher also lower the bodying tendency. It is to be noted here that certain so-called "acid salts" in which the replaceable hydrogen of a polybasic acid is only partially neutralized, e. g., $Na_2HPO_4$, etc., but which in solution are alkali-reacting are, for the purpose of this invention, to be considered alkali-reacting salts.

Also, according to the invention, it has been found that the addition of small amounts of acids, including sulphuric, nitric, phosphoric, hydrohalide acids, boric, tartaric, salicylic, etc. all increase the bodying tendency of calcium sulphate pigments. So do acid reacting salts, e. g. those resulting from the neutralization of a weak base, e. g. $Al(OH)_3$, $Ti(OH)_4$, $Zn(OH)_2$ etc., with a strong acid, e. g. sulphuric, hydrochloric, nitric, phosphoric etc.

The amount of reagent to be admixed with the calcium sulphate pigment will vary depending upon the amount of change in bodying tendency desired. Amounts between about 0.01 per cent and about 2.0 per cent are generally adequate for all practical purposes.

The reagent may be admixed to the pigment either in wet or dry state. For instance, if a composite pigment which is prepared by dry blending titanium dioxide with calcium sulphate is to be treated, the reagent compound may be added during the mixing of these two pigment materials or, it may be added to the calcium sulphate prior to the blending. If a previously prepared composite pigment is to be treated the reagent may be added as a dry powder to the dry pigment, for instance, in a pigment mixing device or, if desired, it may be added as a solution or slurry to the pigment which may be either in the form of a slurry or dry. If both the pigment and reagent are in moist condition a sufficient excess of the reagent should be employed to compensate for that lost during subsequent dewatering, it being understood, that the pigment particles always absorbed a certain amount of the treating agent which is not eliminated with the water during dewatering. If desired, or convenient, previously prepared titanium dioxide or calcium sulphate may be treated with the reagent before these pigments are mixed together to form the composite pigment.

Certain procedures for manufacturing composite titanium dioxide-calcium sulphate pigment involve the calcination at temperatures above about 700° C. of hydrous titanium oxide mixed with calcium sulphate. By selecting a body-controlling reagent which at the temperature of calcination is substantially non-fusible and which does not tend to sinter the pigment particles while at the same time, being stable at the elevated temperature, it is also possible according to the invention to add the reagent prior to calcination.

Having generally described the invention, the following examples will more specifically illustrate it:

EXAMPLE I

A coprecipitated composite $TiO_2$-$CaSO_4$ pigment was tested as above described for bodying tendency. In a bodied paint, i. e. one to which soap solution was added it gave a consistency value of 1000. When this pigment was treated dry with .05% boric acid it gave a bodied consistency value above 14000.

Example II

The pigment used in Example I having a bodied consistency of 1000 when admixed dry with 0.5% lime gave a bodied consistency value of 450.

Example III

A blended composite $TiO_2$-$CaSO_4$ pigment was found to have a bodied consistency value above 14,000. When 0.1% lime was added, the bodied consistency dropped to 5000.

Example IV

A cocalcined composite $TiO_2$-$CaSO_4$ pigment having a bodied consistency value of 770 when treated with 0.6 per cent potassium carbonate gave a bodied consistency value of 400.

The following table presents data as to the effect of some eleven reagents upon the consistency of titanium dioxide-calcium sulphate pigments.

Table I

| Bodied consistency control | Reagent and amount | Character of reagent | Consistency bodied |
|---|---|---|---|
| 880 | .02% oxalic acid | Acid | 1,400 |
| 880 | .02% $P_2O_5$ | do | 1,140 |
| 2,020 | .10% boric acid | do | 7,800 |
| 1,000 | .05% boric acid | do | 14,000 |
| 200 | .02% salicylic acid | do | 400 |
| 200 | .01% $H_2SO_4$ | do | 400 |
| 1,320 | .01% lime | Alkali | 680 |
| 1,320 | .05% lime | do | 480 |
| 1,320 | .05% NaOH | do | 440 |
| 33,000+ | .01% $Na_2CO_3$ | Alkaline salt | 1,760 |
| 33,000+ | .02% $Na_2CO_3$ | do | 800 |
| 770 | .60% $K_2CO_3$ | do | 400 |
| 33,000+ | .20% $Na_2SO_4$ | Neutral salt | 700 |

From this description of the invention it will be seen that all of the agents herein mentioned as suitable for controlling the bodying tendency of calcium sulphate pigments are appreciably water soluble and that by means of the present invention the bodying tendency of calcium sulphate pigment may be controlled as desired. Pigments prepared according to the invention are particularly adapted for use in surface coating compositions, especially flat wall paints for interior finishes. They also are excellently adapted for use in inks, paper, rubber, plastics and similar compositions in which such pigments are incorporated.

We claim:

1. Method for lowering the bodying tendency of a calcium sulphate pigment having an undesirably high bodying tendency which comprises admixing with a preformed, finished calcium sulfate pigment between about 0.01 and about 2.0 per cent of an extraneously prepared compound selected from the group consisting of alkaline-reacting and neutral inorganic compounds having appreciable water-solubility to form a pigmentary composition directly useful for incorporation in surface coating compositions.

2. Method according to claim 1 wherein the pigment specified is pigmentary calcium sulphate.

3. Method according to claim 1 wherein the pigment specified is composite titanium dioxide-calcium sulphate pigment.

4. Method for lowering the bodying tendency of a calcium sulphate pigment having an undesirably high bodying tendency which comprises admixing with a preformed, finished calcium sulphate pigment between about 0.01 and about 2.0 per cent of an extraneously prepared alkaline-reacting alkaline earth metal inorganic compound having appreciable water solubility to form a pigmentary composition directly useful for incorporation in surface coating compositions.

5. Method according to claim 4 wherein the alkaline-reacting inorganic compound is lime.

6. Method for lowering the bodying tendency of a calcium sulphate pigment having an undesirably high bodying tendency which comprises admixing with a preformed, finished calcium sulphate pigment between about 0.01 and about 2.0 per cent of an extraneously prepared alkaline-reacting alkali metal inorganic compound having appreciable water solubility to form a pigmentary composition directly useful for incorporation in surface coating compositions.

7. Method for lowering the bodying tendency of a calcium sulphate pigment having an undesirably high bodying tendency which comprises admixing with a preformed, finished calcium sulphate pigment between about 0.01 and about 2.0 per cent of an extraneously prepared neutral inorganic compound having appreciable water solubility to form a pigmentary composition directly useful for incorporation in surface coating compositions.

8. Method according to claim 7 wherein the neutral inorganic compound is sodium sulphate.

FRANKLIN L. KINGSBURY.
CHARLES L. SCHMIDT.